United States Patent [19]
Halligan et al.

[11] Patent Number: 5,894,485
[45] Date of Patent: Apr. 13, 1999

[54] DISK ARRAY WRITE PROTECTION AT THE SUB-UNIT LEVEL

[75] Inventors: Kenneth A. Halligan, Leominster; Erez Ofer, Brookline, both of Mass.

[73] Assignee: EMC Corporation, Hopkinton, Mass.

[21] Appl. No.: 08/831,481

[22] Filed: Mar. 31, 1997

[51] Int. Cl.$^6$ ............................. G06F 11/10; H03M 13/00
[52] U.S. Cl. ............................................. 371/53; 371/48
[58] Field of Search ............................ 371/53, 48, 21.1

[56] References Cited

U.S. PATENT DOCUMENTS 4,606,016  8/1986  Verboom et al. ...................... 369/54

Primary Examiner—Phung M. Chung
Attorney, Agent, or Firm—Fish & Richardson P.C.

[57] ABSTRACT

A method and apparatus, operating in a system having a plurality of host computers and memory system having a disk controller with at least one mass storage device having a plurality of logical volumes, provide for write protecting the logical volumes. The method features writing, in response to a first host, a write protect message to a memory associated with the controller channel directors; polling, from each channel director, the memory for new write protect messages; and preventing, at, for example, the channel director level, a host connected to the channel director from writing to a protected logical volume which is the subject of the write protect message. The write protect status of that channel director, for that logical volume, remains in effect until the write protect condition for that volume has been reset.

17 Claims, 2 Drawing Sheets

DISK ARRAY WRITE PROTECTION AT THE SUB-UNIT LEVEL

BACKGROUND OF THE INVENTION

The invention relates generally to mass storage memory systems, and more particularly, to a method and apparatus for write protecting logical volumes of a mass memory accessible by multiple host computers.

In a typical memory system employing, for example, a disk drive, the entire disk drive can be manually or electronically write protected in advance. For a floppy disk drive, this involves merely flipping a tab, and in a larger disk drive, such as the gigabit drives available today, the write protect can either be manually set at the drive itself, or electronically set by a user or customer engineer. In either case, the drive becomes write protected against all incoming write requests. In addition, the write protection is typically set in advance, so that the status of the drive, that is, what data has been written to the drive, must be known in advance.

Large disk drive memories are typically divided into a plurality of logical volumes. Thus, a single disk drive might have 4, 8, or more logical volumes. In addition, each of the logical volumes can be accessible by plural host computers. Thus, one host computer may be responsible for writing and maintaining a database in a first logical volume on the disk drive and other host computers are ordinarily only expected to read the database for their varying purposes and applications. Other host computers may be responsible for other logical volumes on the same disk drive unit.

In some smart disk drive controllers, such as the EMC Symmetrix disk drive controller, logical volumes can be protected manually during operation. In these instances, however, the user or customer engineer must know in advance when the write operation(s) for data on the drive which is to be protected, has been completed, and thereafter, the user or customer engineer can write protect the logical volume or the entire drive manually. There exists no mechanism by which a host computer can write protect data at a logical volume from any of the other host computers having access to that data.

SUMMARY OF THE INVENTION

The invention relates to a system having a plurality of host computers, a disk controller system, and at least one mass storage device controlled by the controller and having a plurality of logical volumes, at least one of the logical volumes able to be written to by at least two of the hosts through a channel director or SCSI adapter of the disk controller. The method of the invention for write protecting such a logical volume features the steps of writing, in response to a first host, a write protect message to a memory associated with the channel directors; polling, from each channel director, the memory for new write protect messages; and preventing, at the channel director level, a host connected to the channel director from writing to a protected logical volume which is a subject of a write protect message until a release of the write protect message has been received.

In another aspect, the method of the invention features the steps of providing a global memory; connecting each channel director to the global memory; providing a mailbox in the global memory for each connected channel director; and periodically polling, from each channel director, its mailbox for the write protect messages, the write protect message being one of a plurality of possible messages stored in each mailbox.

The apparatus of the invention features a mass storage controller system having a global memory, a plurality of channel directors, each connected to the global memory and able to send and receive data and commands to and from at least one host computer, each channel director having a mailbox slot in the global memory to which it can read and write data, each channel director being able to write to each other channel director's mailbox slot in said global memory, and each channel director ordinarily able to receive data and commands from a host and direct said received data to a logical volume of a mass memory device, each channel director. Further, each channel director, in response to a received logical volume write protect command from a host computer, writes a write protect message to the slots within global memory for other hosts able to write to said logical volume to be protected, each channel director periodically polls its mailbox slot for new messages, and each channel director responds to a write protect message in its mailbox slot in the global memory for preventing further write operations to the protected logical volume.

In a particular embodiment, the control system features a global memory having a plurality of channel director mailboxes, each mailbox having a mailbox slot, and each channel director being connected to the global memory over a SCSI protocol.

In yet another aspect of the invention, the control system further features each mailbox slot having a bit for each logical volume to which the control system can write, the value of the bit for a mailbox slot identifying whether the corresponding logical volume is write protected to the channel director associated with that slot. Each mailbox slot further has associated therewith a check sum for checking the validity of the write protect message data.

The invention thus advantageously allows a host computer to protect, dynamically and on the fly, one or more logical volumes to which it needs to limit write access. In other aspects, the invention advantageously allows the write access limitation to be effected at the channel director level, the disk director level, the host level, or substantially any combination thereof as desired by the system designer.

BRIEF DESCRIPTION OF THE DRAWING

Other objects, advantages, and features of the invention will be apparent from the following description taken together with the drawings in which.

DESCRIPTION OF A PREFERRED EMBODIMENT OF THE INVENTION

Figure 1:
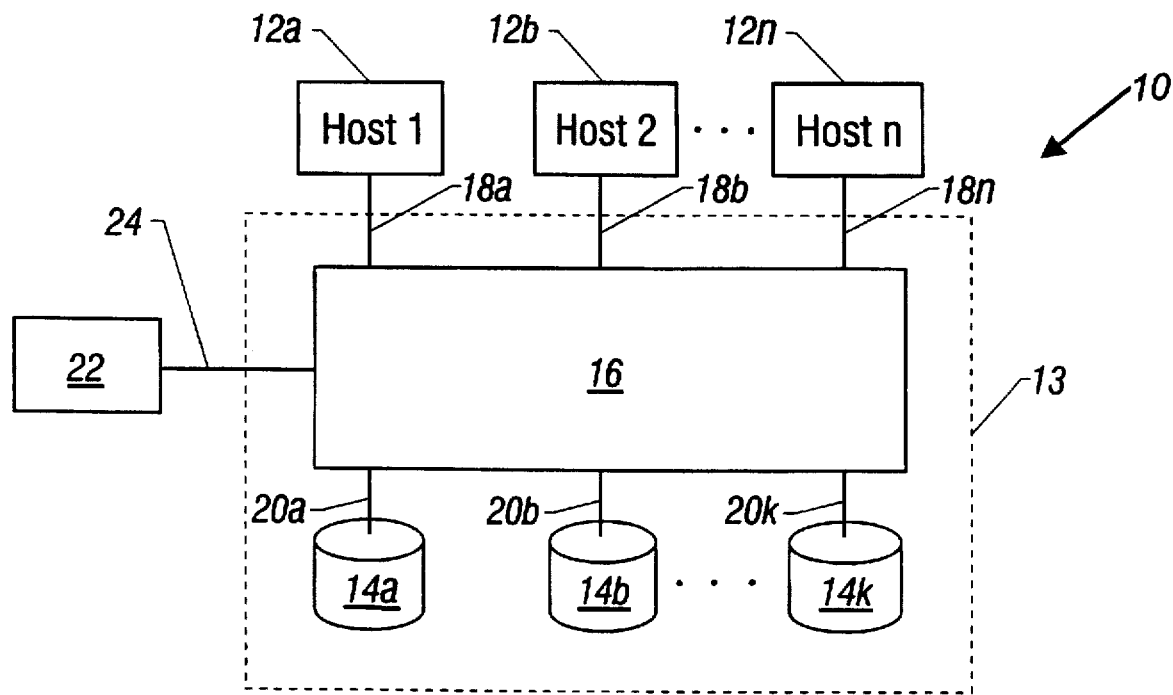
FIG. 1 is a system description in accordance with the invention describing the environment in which the invention operates.

Referring to FIG. 1, the invention relates to a computer system 10 which has a plurality of host computers 12a, 12b, . . . , 12n and a mass storage system 13 having a plurality of disk drive elements 14a, 14b, 14k. Interconnecting the host computers 12 and the disk drive elements 14 is a disk drive controller, for example, that made by EMC and known as the Symmetrix controller. The disk drive controller 16 receives memory commands from the various host computers over buses 18a, 18b, . . . , 18n respectively, for example, connected and operating in accordance with a SCSI protocol, and delivers the data associated with those commands to the appropriate disk drive elements 14 over respective connecting buses 20a, 20b, . . . 20k. Buses 20 also preferably operate in accordance with a SCSI protocol.

Each of the disk drive elements 14 typically has in excess of one gigabyte of memory and is logically divided, in accordance with known techniques, into a plurality of logical volumes. Each disk drive element 14 can thus have a plurality of logical volumes, for example 4, 8, or more logical volumes on a single disk drive element. In a typical configuration, the controller system also connects to a console PC 22 through a connecting bus 24. Console PC 22 is used for maintenance and access to the controller and can be employed to set parameters of the controller as is well known in the art.

As indicated above, in operation, it can often occur that one host, for example host 12a as well as a second host, for example host 12b, can each write not only to the same disk drive unit, for example disk drive 14a, but even to the same logical volume of that disk drive unit. In accordance with the invention, one host computer can command, through the disk drive controller 16, that a particular logical volume to which it has read and write privileges can be write protected against all other host computers, at, for example, in the Symmetrix device, the channel director level.

Figure 2:
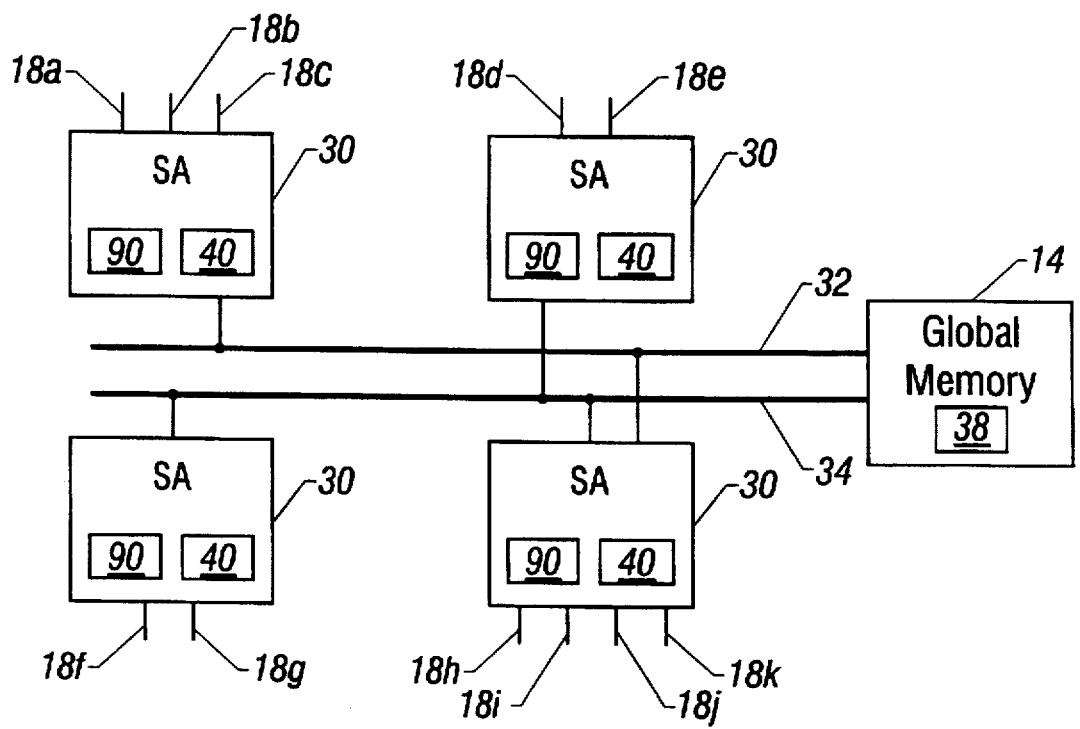
FIG. 2 is a block diagram showing the interconnection of various channel directors to the global memory in accordance with the invention.

Thus, referring to FIG. 2, within a disk controller 16 to which the invention is particularly useful, each host computer connects to a channel director 30 (also referred to as a SCSI adaptor) over the SCSI bus lines 18. Each channel director in turn connects, over a one or more system buses 32 or 34, to a global memory 36. The global memory, preferably a large memory through which the channel directors can communicate to the disk drives, and including a portion acting as a cache memory for the system, also, has therein a plurality of mailboxes 38, one mailbox for each channel director 30. Each mailbox, which physically consists of a portion of the global memory, can be read and written by each channel director. Within a channel director's mailbox; therefore, in accordance with a preferred embodiment of the invention, there is provided a memory mailbox slot, for example, 256 bits long, which defines the write protect status, for each logical volume, here up to 256 logical volumes, to which that channel director has access. Thus, each channel director can read its mailbox, and in particular, the mailbox slot relating to write protect messages, and determine to which logical volumes it cannot write. That information for a channel director is also stored by the channel director, at the channel director at a memory section 40. As will be described further below, associated with each write protect message slot in each mailbox is a flag or semaphore indicating that the write protect message slot has changed since the last time the channel director read it, and a check sum which in the illustrated embodiment, is a CRC check sum on the 32 bytes of information stored in the channel director's mailbox slot. The CRC check sum thus provides a validity check to enable the channel director to validate the data in the write protect message slot.

Figure 3:
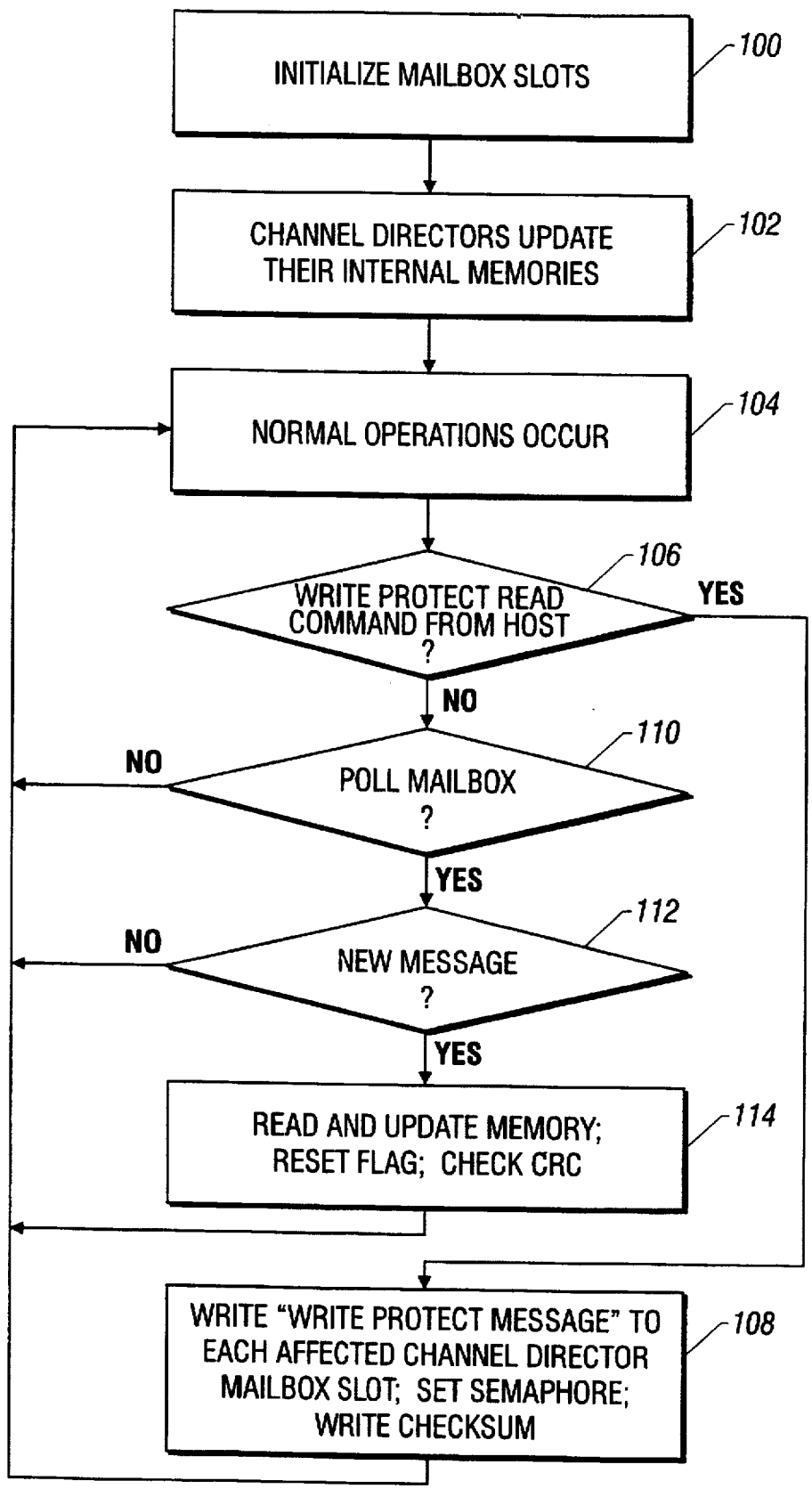
FIG. 3 is a flow chart illustrating the operation of a system in accordance with the invention.

Referring to FIG. 3, in operation, each of the mailbox slots, in global memory, relating to the write protect function is initialized at power up from the non-volatile memory 90 associated with each channel director. Before initializing the mailbox, each channel director validates the data by checking the CRC associated with it. If the CRC is correct, the mailbox is updated. If the CRC is not correct, the mailbox is initiated so that all hosts will have write access to each logical volume. This is indicated at step 100. Each channel director 30 then reads its own write request mailbox and stores the results in its own memory 40. Each channel director, in the illustrated embodiment reads its mailbox using a memory read. This is indicated at 102. Thereafter, each channel director reads and writes to global memory, or through the global memory to the disk drives in accordance with "normal operation". This is indicated at 104. If there is waiting a command from a host computer directing a particular logical volume to be write protected, tested at step 106, the channel director 30 to which the command is directed modifies the mailbox for each channel director using a read modified write command, setting the bit, or bits for the logical volume or volumes to be protected equal to, in the illustrated embodiment, a "1". The channel director also calculates a CRC check sum which it also will write to each mailbox and further sets a semaphore in global memory for each of the channel directors for which there is a new message waiting condition. This is indicated at step 108. Control then passes on to "normal operations", step 104. If there is no write protect command from the host, in the illustrated embodiment, approximately every half second, each channel director polls, at 110, its mailbox to determine whether a modified write protect message is waiting for it. If a new message is available at 112, that message is read, as indicated at 114, and the internal memory 40 is updated. If no new message is waiting, control returns to "normal operations".

After writing a "write protect message" at 108, each channel director including the channel director which wrote the write protect data message, will, after polling its mailbox, read any new message and update its own memory which stores the write permissions for the host connected to it, and store the information in the non-volatile memory for use during power-up (for example after a power failure) (step 114). Upon reading that message, the semaphore, previously set at step 108 for that particular mailbox, will be reset. After a logical volume has been write protected, then, any host connected to a channel director, which no longer has write permission to that logical volume, will be unable to write data to that logical volume (although it can still read data from the logical volume). Any attempt by the host to write data will be "rejected" by the channel director which provides a device unavailable response to the host.

In this illustrated embodiment of the invention, the write protect message has the granularity of the channel director. In a typical Symmetrix device, there can be up to 32 channel directors, and therefore there are 32 associated mailbox slots in global memory. In other embodiments of the invention, however, the granularity can be finer or coarser. Thus, if each channel director can connect to up to four host computers, the granularity can be set at the host computer level so that each mailbox will have one bit for each channel director port (to which a host computer can connect). As is well known in connection with the Symmetrix disk drive controller system, each host has the ability to obtain a full configuration readout showing the read/write permissions of all of the hosts and disk drives (and logical volumes) connected in the system and, accordingly, can direct write protection at either the host level, or the channel director level.

In a preferred embodiment of the invention, the write protect message for each mailbox associated with a channel director can also be modified from the console PC 22 over connecting channel 24. The PC console thus has the capability to modify and write to the various mailboxes associated with the channel directors, and to write protect data "on the fly" as a process is proceeding. This protect mechanism can be employed, for example, where a particular host computer 12 does not have available to it the command structure or application software which will enable it to write protect one or more of the logical volumes for which it may have responsibility.

The host computers can similarly remove write protection for a logical volume in the same manner in which write protection is added for the volume. In that instance, the command to the channel director causes the channel director to reset a write protect bit, that is, to rewrite it as a "zero" following the general outline of operations illustrated in FIG. 3. The change in write protect message is then read as the channel director(s) periodically poll the global memory, noticing the set semaphore, reading the message and storing the read message by updating its own internal memory 40 which defines the write permissions to which it must adhere (and storing the information in the non-volatile memory).

Additions, subtractions, and other modifications of the preferred embodiment of the invention will be apparent to those of skill in the field and are within the scope of the following claims.

What is claimed is:

1. In a system having a plurality of host computers and at least one reuseable mass storage device having a plurality of logical volumes, at least one of said logical volumes being able to be written to by at least two of said hosts, a method for write protecting a said logical volume comprising writing, in response to a first host, a write protect message to a memory, said message being associated with the logical volume, polling, at the mass storage device, the memory for new write protect messages, and preventing, at the mass storage device, a host from writing to a protected logical volume which is the subject of a write protect message until a release write protect message is received.

2. The method of claim 1 further comprising providing a global memory, providing a plurality of channel directors for receiving commands and data from host computers, connecting each channel director to said global memory, providing a mailbox is said global memory for each connected channel director, and each channel director periodically polling its mailbox for said write protect messages, said write protect message being one of a plurality of possible messages stored in each said mailbox.

3. The method of claim 2 further comprising writing, from each channel directors, to mailboxes for each other channel director, for protecting a logical volume from being written by any selected host computer.

4. The method of claim 2 further comprising setting a semaphore for each write message in said memory for indicating a new, unread, write protect message.

5. The method of claim 1 further comprising determining a check sum validation for said write protect message, and writing said check sum validation to said memory along with said write protect message.

6. The method of claim 1 wherein said polling step comprises periodically polling said memory.

7. The method of claim 2 further comprising reading said write protect message in response to said polling step, and storing said write protect message at a local memory at said channel director when a new write protect message is available at said memory.

8. The method of claim 7 further comprising storing said write protect message in a non-volatile memory.

9. A mass storage control system comprising a global memory, a plurality of channel directors, each connected to said global memory and able to send and receive data and commands to and from at least one host computer, said global memory having a mailbox slot for each channel director to which it can read and write data, said global memory and said channel director being configured so that each channel director can write data to each other channel director's slot in said global memory, each channel director ordinarily able to receive data and commands from a host and write said data to a logical volume of said mass storage system, each channel director, in response to a received logical volume protect command from a host computer, writing a write protect message to the slots within global memory for at least one other host able to write to said logical volume to be protected, each channel director periodically polling its mail slot for new massages, and each channel director responding to a write protect message in its mailbox slot in said global memory for preventing further write operations to said protected logical volume.

10. The control system of claim 9 further wherein, said global memory has a plurality of channel director mailboxes, each mailbox having a said mailbox slot, and each channel director being connected to said global memory.

11. The control system of claim 9 further comprising each mailbox slot having a bit for each logical volume to which the control system can write, the value of said bit for a mailbox slot identifying whether the corresponding logical volume is write protected to said channel director associated with said slot.

12. The control system of claim 11 further comprising each mailbox slot includes a check sum for checking the validity of the write message data.

13. The control system of claim 11 wherein said channel director determines a check sum based on said write protect message and writes said check sum to said global memory.

14. The control system of claim 13 wherein said channel director further sets a semaphore in said global memory when it writes said write protect message to said global memory.

15. The control system of claim 14 wherein said channel director responds to a set semaphore for reading a write protect message in its mailbox slot and for storing said write protect message in its internal memory.

16. The control system of claim 9 wherein each said channel director, in response to a write request for a connected host, queries its internal write/read privileges stored in its internal memory for determining whether it can direct a write data block to a specified logical volume.

17. The control system of claim 16 wherein said channel director, in response to a logical volume command, rewrites the write protect messages of other directors connected to the global memory, including changing a write protect status to a read/write status.

* * * * *